May 25, 1954 V. C. PATTERSON 2,679,323

LOADING AND UNLOADING MECHANISM FOR QUICK FREEZE APPARATUS

Filed Oct. 25, 1949 11 Sheets-Sheet 1

INVENTOR

Velt C. Patterson

BY [signature]

ATTORNEY

May 25, 1954 V. C. PATTERSON 2,679,323

LOADING AND UNLOADING MECHANISM FOR QUICK FREEZE APPARATUS

Filed Oct. 25, 1949 11 Sheets-Sheet 2

INVENTOR

Velt C. Patterson

BY [signature]

ATTORNEY

May 25, 1954 V. C. PATTERSON 2,679,323

LOADING AND UNLOADING MECHANISM FOR QUICK FREEZE APPARATUS

Filed Oct. 25, 1949 11 Sheets-Sheet 3

INVENTOR

Velt C. Patterson

BY

ATTORNEY

May 25, 1954 V. C. PATTERSON 2,679,323

LOADING AND UNLOADING MECHANISM FOR QUICK FREEZE APPARATUS

Filed Oct. 25, 1949 11 Sheets-Sheet 4

INVENTOR

Velt C. Patterson

BY

ATTORNEY

LOADING AND UNLOADING MECHANISM FOR QUICK FREEZE APPARATUS

Filed Oct. 25, 1949 11 Sheets-Sheet 5

INVENTOR
Velt C. Patterson

BY [signature]
ATTORNEY

LOADING AND UNLOADING MECHANISM FOR QUICK FREEZE APPARATUS

Filed Oct. 25, 1949 11 Sheets-Sheet 6

INVENTOR

Velt C. Patterson

BY

ATTORNEY

LOADING AND UNLOADING MECHANISM FOR QUICK FREEZE APPARATUS

INVENTOR
Velt C. Patterson
BY
[signature]
ATTORNEY

May 25, 1954 V. C. PATTERSON 2,679,323

LOADING AND UNLOADING MECHANISM FOR QUICK FREEZE APPARATUS

Filed Oct. 25, 1949 11 Sheets-Sheet 8

INVENTOR

Velt C. Patterson

BY

ATTORNEY

INVENTOR

Velt C. Patterson

BY

ATTORNEY

LOADING AND UNLOADING MECHANISM FOR QUICK FREEZE APPARATUS

Filed Oct. 25, 1949 11 Sheets-Sheet 10

INVENTOR
Velt C. Patterson

BY [signature]
ATTORNEY

May 25, 1954 V. C. PATTERSON 2,679,323

LOADING AND UNLOADING MECHANISM FOR QUICK-FREEZE APPARATUS

Filed Oct. 25, 1949 11 Sheets-Sheet 11

INVENTOR

Velt C. Patterson

BY [signature]

ATTORNEY

Patented May 25, 1954

2,679,323

UNITED STATES PATENT OFFICE 2,679,323

LOADING AND UNLOADING MECHANISM FOR QUICK FREEZE APPARATUS

Velt Cowan Patterson, York, Pa., assignor to Freezing Equipment Sales, Inc., York, Pa., a corporation of Pennsylvania Application October 25, 1949, Serial No. 123,408

16 Claims. (Cl. 214—16)

This invention pertains to the quick or sharp freezing of food products. More particularly this invention relates to a fully automatic machine for continuously quick freezing large quantities of pre-packaged food products, such as vegetables, fruit, fish, and meat, etc., and for continuously quick-hardening pre-packaged ice cream in the semi-frozen or plastic condition in which it emerges from a commercial ice cream freezer.

Quick freezers adapted to freeze pre-packaged food products in a continuous operation are known in the freezing art. Such freezers, however, are not entirely satisfactory for several reasons, such as insufficient capacity, impractical design, special space requirements, lack of fully automatic operation, frequent package damage, undue package bulging because of expansion of the food contents during the freezing process, etc.

Therefore, it is an object of this invention to provide a fully automatic, compact, practical machine which will quick freeze large quantities of completely pre-packaged food products in a continuous operation.

It is another object of this invention to provide such a freezing machine that is relatively simple in design, that is suitable for use upon one floor of a conventional building, that is economical to construct and operate, and that is easy to maintain.

A further object of this invention is to provide such a machine with a practical conveyor system, having a minimum of moving parts, for transporting the pre-packaged food products through the freezing zone without danger of jamming or of damaging the food packages.

Another object is to provide relatively simple mechanism for rapidly feeding pre-packaged foods to be frozen into the machine, and for simultaneously discharging frozen packages therefrom without damage to the food packages.

Another object of this invention is to provide simple mechanism for eliminating unsightly bulging of the package by the freezing process, and to preserve and maintain the shape and size of the package within predetermined limits.

Still another object is to provide a system of interlocking timed controls for correlating the operation of the feeding and the conveying mechanisms.

A further object of this invention is to provide a continuous quick freezer for pre-packaged food products having a potential production rate, for rectangular packages of conventional retail size, of about 120 such packages per minute.

Other objects and advantages of the invention will be evident from the following description and accompanying drawings, in which.

The quick freezer which embodies this invention makes use of a relatively high velocity circulating current of refrigerated air as the freezing medium. The packages are supported on metallic trays or package carriers for travel in a closed circuit or path through the refrigerated air current which quickly abstracts heat from the carriers and the packages. Quick freezing from room temperature by this method, of packages of food products of conventional shape and size for retail marketing, usually requires between two to three hours, depending upon the nature of the food to be frozen and the heat insulating characteristics of the package wrapper or carton which is usually of paper or cardboard. Therefore, it is evident that a quick freezer of this type which is capable of a high production rate must have a large freezing residence capacity. For example, if a production, or freezing, rate of about 120 packages per minute is desired, the freezer which is the subject of this invention is designed to continuously maintain at least about 14,500 packages in freezing residence. For lower production rates, the freezing residence capacity may be reduced substantially proportionately. Quick hardening of ice cream, in pint packages, by this method, however, requires only about one hour. Hence, a production rate of 120 pint packages of ice cream per minute requires a freezing residence capacity of only about 7,250 packages.

The invention will be described with reference to a machine having a freezing residence capacity of about 14,500 packages, but it will be understood that the principles of the invention may be incorporated in machines having various freezing residence capacities and production rates. Additionally, although the specific embodiment of a freezer used to illustrate this invention is designed to handle food packages which are conventionally in the shape of a rectangular prism, it will be obvious that the freezer may be adapted to handle packages having other shapes, e. g. the conventional cylindrical cardboard containers for ice cream, cylindrical cans of fruit juice, etc.

*The freezing chamber*

Figure 1:
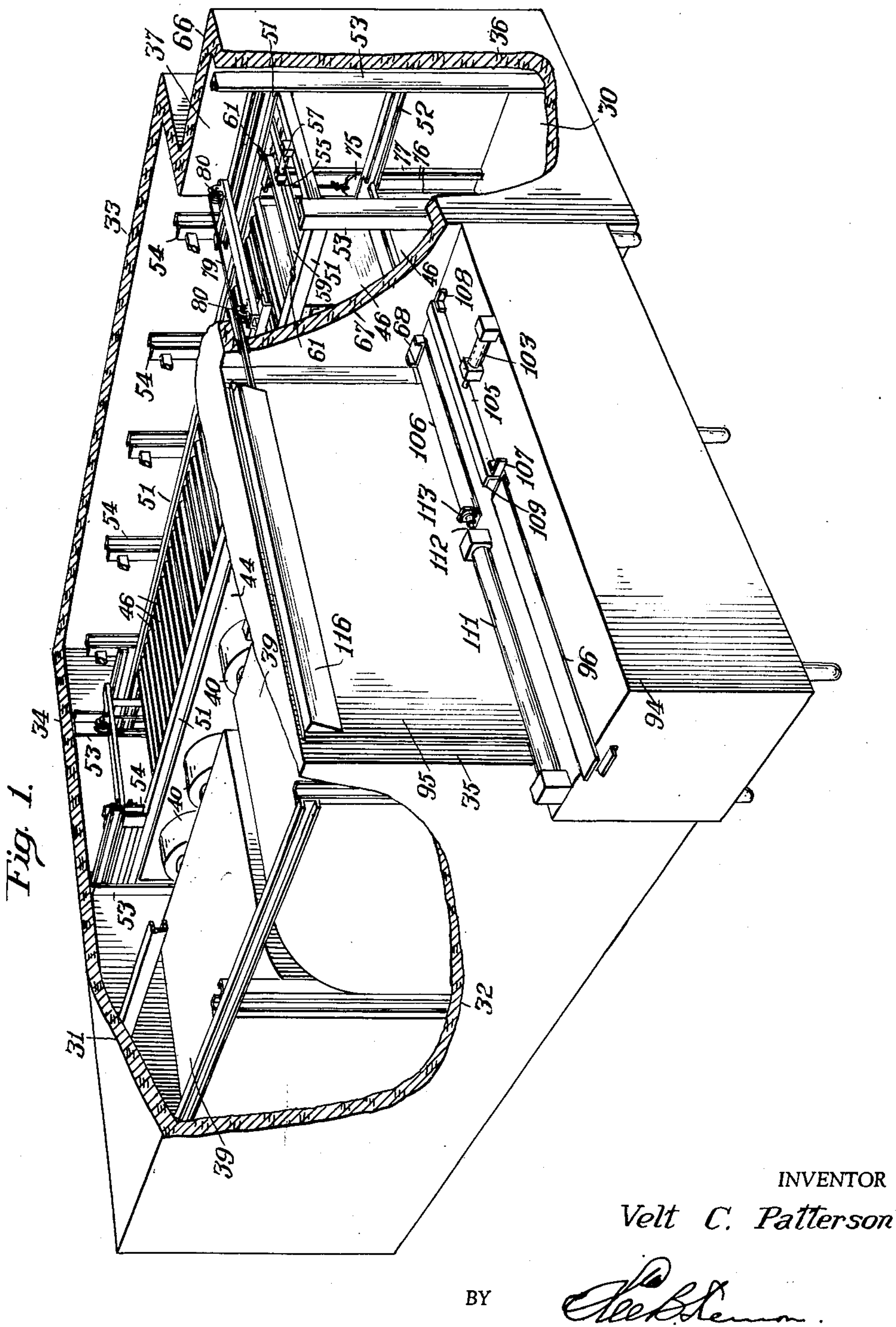
Figure 1 is a perspective, partial sectional view of a freezing machine embodying this invention. Portions are cut away to show details and certain elements are omitted for simplification.
Figure 2:
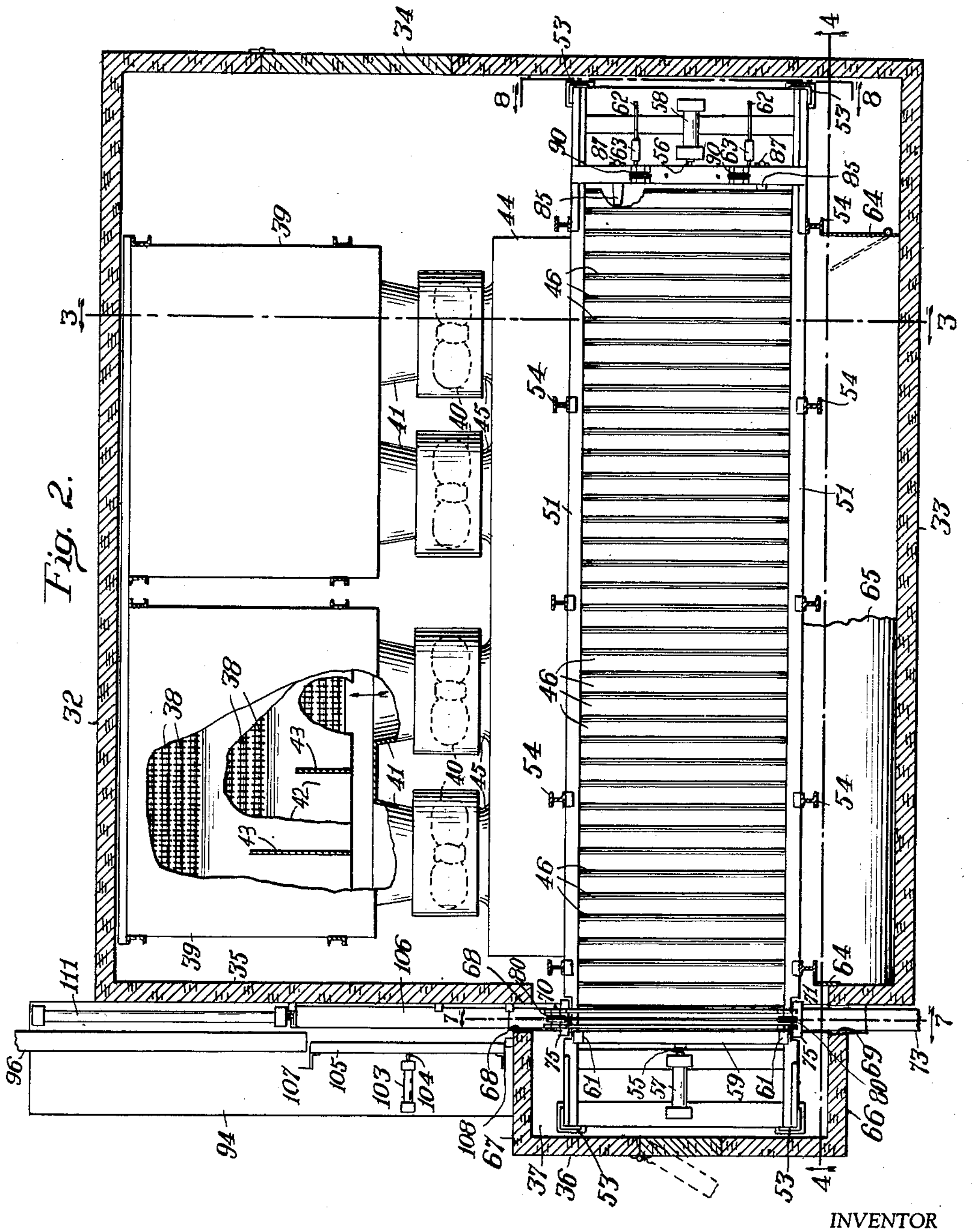
Figure 2 is a plan view of the machine shown in Figure 1 with the top wall removed. Again, certain elements are omitted for simplification.

Referring now to Figure 1, there is shown a freezing chamber of substantially rectangular configuration, having suitably insulated bottom, top, side, and end walls 30, 31, 32 and 33, and 34 and 35, respectively. Doors at each end of the chamber (as shown in Figure 2) provide ready access thereto. As an example of a suitable installation, this chamber may be about 28 feet long, 20 feet wide, and about 10 feet high, in overall dimensions. An outwardly offset portion 36 of the end wall 35 forms a rectangular recess 37 into and from which packages to be frozen are fed and discharged, as later described. Mounted in the freezing chamber along the side wall 32 are two series of finned refrigerating coils 38, enclosed in open-bottomed housings 39 and through which a suitable refrigerant is circulated. The coils 38 are connected to any suitable refrigeration machinery located outside of the chamber. Since such machinery forms no part of this invention it need not be, and is not, illustrated or further described. It is sufficient to state that by conventional means the coils are maintained at a temperature sufficiently low to cool the air passing thereover (as later described) to a temperature of about −40° F.

Figure 3:
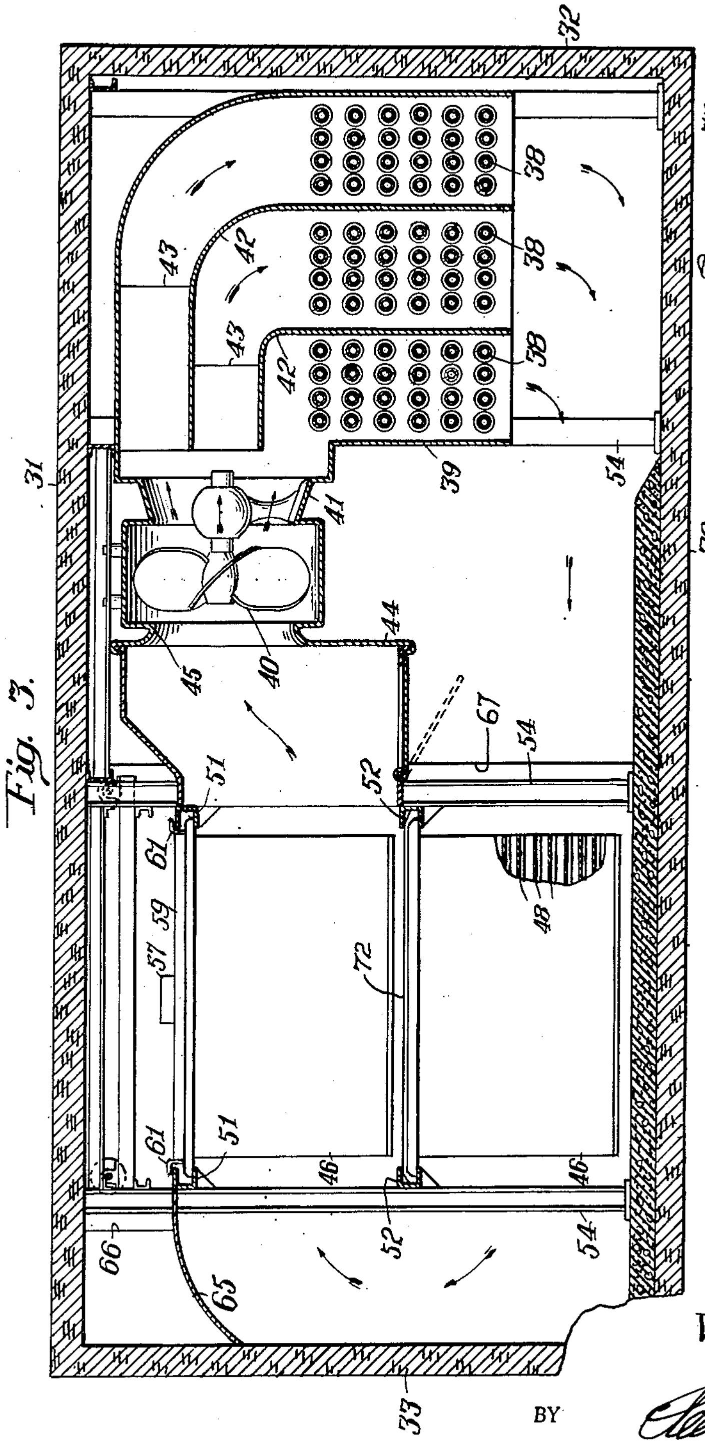
Figure 3 is a sectional view taken on line 3—3 of Figure 2.

Air is circulated over the coils 38 by blowers or air impellers 40 which are suspended in a longitudinal row along the upper central portion of the freezing chamber. Four such impellers are shown, for purposes of illustration. Ducts 41 confine and guide the horizontal air currents issuing from the impellers into the upper portion of the housings 39 where curved baffles 42 and vertical dividers 43 (see Figure 3) direct the current downwardly and assure even distribution of the air over the coils 38. The air current, which has been refrigerated during its passage over the coils, emerges from the bottom of the housings 39 (as best shown in Figure 3) and is deflected by the chamber side and bottom walls 32 and 30, respectively, back across the lower portion of the chamber to the other side wall 33 where the air currents pass upwardly, and are drawn back into an open-sided manifold 44. This manifold is connected by ducts 45 to the inlet side of the impellers 40.

Thus, it will be seen that a current of refrigerated air is continuously circulated in a vertically-disposed closed path back and forth across the freezing chamber. That portion of the chamber adjacent the side fall 33 which is traversed by the air current is termed the freezing zone. It is pointed out, however, that substantially the entire chamber is maintained at a temperature of about −40° F. It also is to be noted that the refrigerated air current is at a slightly lower temperature when it passes across the lower portion of the chamber beneath the impellers 40 than when it is drawn into the manifold 44 at the upper portion of the chamber. Such temperature differential exists because the lower portion of the air current has just been cooled by passage over the refrigerating coils, while the upper reaches of the air current has been somewhat warmed by abstraction of heat from the food packages (as later described).

*The conveyor mechanism*

The mechanism for moving the pre-packaged food products to be frozen through the current of refrigerated air in the freezing zone is disposed adjacent to and along the wall 33 of the chamber, opposite the refrigerating coils 38. The conventional retail packages are supported and carried during their passage through the freezing zone, and also during their entire movement within the chamber, in trays or package carriers 46 (shown best in Figure 14). Such carriers have two spaced parallel side walls 47 which support a series of vertically spaced open-ended shelves 48 therebetween. Twelve such shelves are shown in the drawings for purposes of illustration. Each shelf 48 is proportioned to carry a row of packages, arranged side-by-side in abutting relationship, with the ends of each row disposed substantially flush with the end edges of the side walls 47, as shown in dotted lines in Figure 7. If, for example, the carriers 46 are designed to support and carry on each shelf 15 packages, each 4″ wide, 5⅜″ long and 1¾″ thick, the carriers will be 60″ long. For a package of these dimensions, the carriers will be about 6″ wide and have their shelves spaced vertically about 3″ apart. Thus, only a small clearance will exist between the carrier side walls and the end faces of the packages, but sufficient clearance will exist between the upper faces of the packages and the underside of the next higher shelf, to form passageways for the circulation of refrigerated air through the loaded shelves, as later described. Preferably, at least the shelves 48 and the side walls 47 of the package carriers are formed of aluminum, or an alloy thereof, for lightness of weight combined with structural strength and also to enable rapid heat abstraction therefrom.

Figure 5:
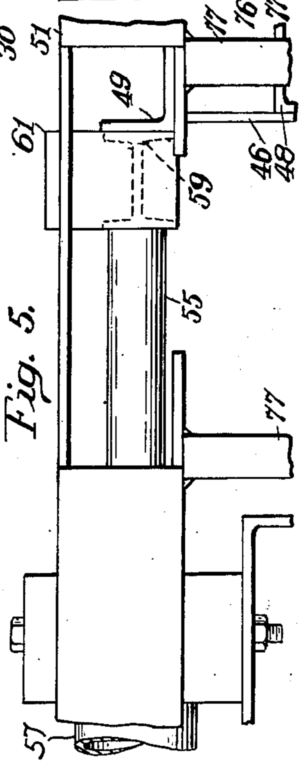
Figure 5 is an enlarged fragmentary view of a portion of Figure 4.

The side walls of the carriers depend from a channel member 49 (Figure 14) of slightly greater width than the main body of the carriers. This member 49 projects outwardly from the opposite ends of the upper portion of the package carriers to form supporting arms 50 by which the carriers may be suspended for slidable movement in a pair of opposed, parallel, inwardly-facing, channel guide rails. Upper and lower horizontal parallel pairs of such rails, 51 and 52 respectively, are arranged longitudinally along the side wall 33 of the chamber in the freezing zone. These pairs of rails are supported by suitable framework, comprising corner posts 53 and vertical I beams 54, the said framework being spaced somewhat inwardly of the side wall 33. Suspended in each pair of rails is a horizontal row of package carriers 46, with the flanges of their channel members 49 in abutting relationship and their side walls 47 spaced somewhat apart. About forty carriers 46 are shown in each row for purposes of illustration. The two rows of carriers are intermittently advanced in opposite directions (as indicated by the arrows in Figure 4) by upper and lower plungers, 55 and 56 respectively, which are operated by corresponding hydraulic motors 57 and 58. The plungers 55 and 56 are equipped with transverse pusher bars, 59 and 60 respectively, which act against the flange of the channel member 49 of the rearmost carrier in each row. The opposite ends of the upper pusher bar 59 are slidably supported on the upper flanges of the upper pair of guide rails 51 by hangers 61 (see Figures 5 and 7), while the oppostie ends of the lower pusher bar 60 are supported and guided by rearwardly extending rods 62 which are slidably mounted in sleeves 63 (see Figures 8 and 9).

At each operation of the plungers 55 and 56 the upper and lower rows of carriers are advanced, simultaneously, a distance equal to the full width of a carrier 46. In the intervals between operation of the plungers, mechanism later described, lowers the foremost carrier of the upper row, by gravity, to the lower set of guide rails 52, where such lowered carrier becomes the rearmost carrier of the lower row. At the same time the foremost carrier of the lower row is raised by mechanism, later described, to the upper set of guide rails 51, where such raised carrier becomes the rearmost carrier of the upper row. Thus, the package carriers travel step-by-step in an endless circuit back and forth through the freezing zone tranversely through the refrigerated currents of air.

The open side of the manifold 44 is substantially coextensive in height with the upper row of carriers and disposed closely against the side of this row. Hence, the current of refrigerated air must flow through the loaded shelves of the upper row of carriers, over the packages thereon, and between adjacent carriers before being drawn into the manifold. Vertical partitions 64 and a horizontal curved partition 65 disposed between the wall 33 and the rail-supporting framework (see Figures 2, 3, and 4) force the greater portion of the air current also to flow through the loaded shelves of the lower row of carriers and between adjacent carriers before passing upwardly along the wall 33 for flow through the upper row of carriers. Thus, heat is rapidly abstracted from the food packages on the carrier shelves and from the carriers by the refrigerated air currents. Since the carriers pass first through the upper portion of the current of air and then through the slightly colder lower portion of the currents flowing in the opposite direction, the packages are assured of uniform freezing treatment. It is also to be noted that the chamber recess 37 is disposed out of the air current in a zone of relatively quiet refrigerated air.

The forward end of the lower row and the rearward end of the upper row of carriers are located in the recessed portion 37 of the freezing chamber. This portion 37, which is disposed out of the current of refrigerated air, is provided with opposed parallel walls 66 and 67 located closely adjacent opposite sides of the rails 51 and 52. Opposed package entrance and exit openings 68 and 69, respectively, are formed in the opposite walls 67 and 66, respectively, substantially in alignment with the top shelf of a carrier, when the latter is suspended from the lower rails 52 at the limit of its travel thereon. Extending substantially horizontally inwardly through the entrance opening 68 toward a corresponding end of the foremost carrier in the lower row is a slidably-mounted carrier-loading gangway 70, shown best in Figure 7. The bottom of this gangway 70 is disposed slightly above the top shelf of the carrier and the spacing between the gangway inner end and the carrier normally is sufficient to permit vertical movement of the carrier without interference with the inner end of the gangway. Extending inwardly and upwardly through the exit opening 69 is an inclined carrier-unloading chute 71 (Figure 7) having its inner end spaced slightly below the top shelf of the carrier. Sufficient clearance also exists between the inner end of this chute and the carrier to permit vertical movement of the carrier without interference with the inner end of the chute.

Figure 6:
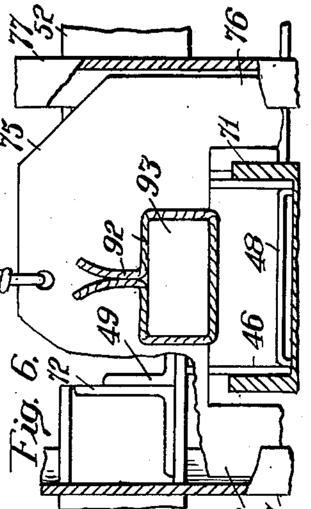
Figure 6 is an enlarged fragmentary view of another portion of Figure 4.
Figure 7:
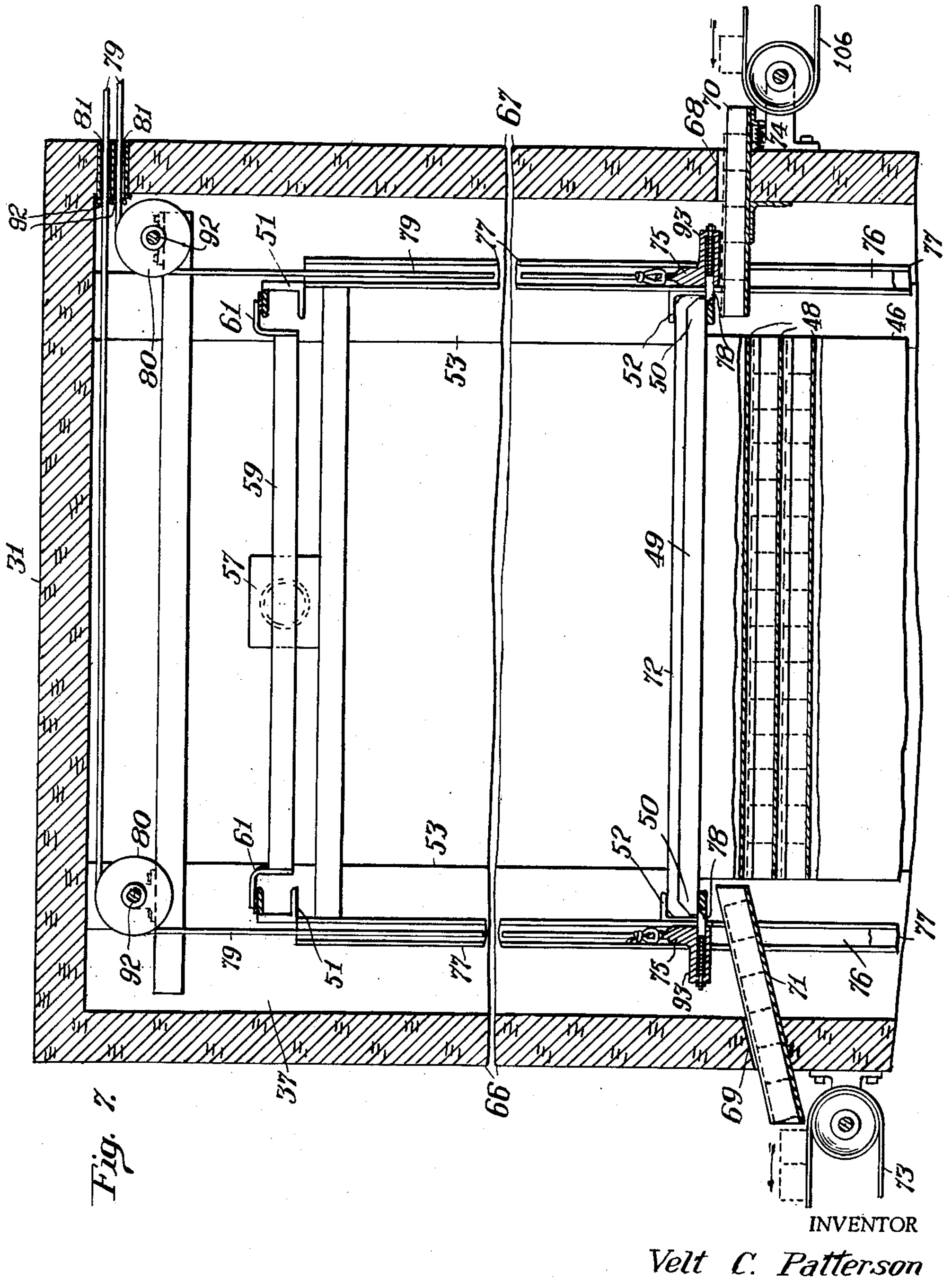
Figure 7 is an enlarged sectional view taken on line 7—7 of Figure 2.

After the lower row of carriers has been advanced by the lower plunger 56 into contact with a carrier positioning stop member 72 (Figures 6 and 7), a row of side-by-side abutting packages, propelled by mechanism later described, is advanced along the loading gangway 70 through the entrance opening 68, and onto the top shelf of the foremost package carrier in the lower row of carriers, as illustrated by the dotted lines in Figure 7. The distance through which the row of packages is advanced is equal to the length of one shelf-load, i. e. about five feet, to continue the aforementioned illustration. Hence, a shelf-load row of packages to be frozen is moved onto the top shelf. This newly introduced shelf-load row of packages displaces and pushes a previously loaded row of packages, which have been adequately frozen during the carrier circuit through the freezing zone, off the top shelf, and onto the unloading chute 71. Frozen packages emerging from the exit opening 69 drop off the outer end of the unloading chute onto a suitable continuously-running take-away conveyor 73 for transportation to a stacking or boxing station (not shown) and thence to a cold storage room (not shown). Thereafter the carrier is raised (by mechanism later described) to place the next lower shelf substantially in line with the inner ends of the gangway 70 and the chute 71, and the same shelf loading and unloading operation is repeated. The foremost carrier in the lower row thus continues to be raised step-by-step, i. e. upwardly indexed, until all its shelves have been unloaded of their frozen packages and reloaded with packages to be frozen.

During the operation of the freezer the gangway 70 remains full of packages, which substantially plug the package entrance opening 68 and thus prevent escape of the freezing medium, i. e. refrigerated air, therethrough. In order to avoid the possibility of interference between the shelf ends and the adjacent end of the innermost package still on the loading gangway 70, this gangway is slidably moved inwardly, almost into contact with a carrier being loaded, by the mechanism which propels the shelf-load rows of packages onto the carrier shelves, as later described. Retraction of such mechanism permits retraction or outward movement of the loading gangway 70 by a spring 74 or other suitable retracting mechanism, such as a counterweight (not shown). Thus, the inner end of the foremost package on the gangway 70 is positively drawn back from the carrier 46 after a shelf has been loaded to prevent interference therebetween upon ascent of the carrier. The unloading chute 71 is fixed in position, but in order to prevent interference between the innermost package thereon and the carrier 46, this chute is inclined sufficiently (as shown in Figure 7) to cause the packages, pushed thereon, to slide outwardly, by gravity, before the carrier is moved upwardly for another shelf loading and unloading cycle. Even though all of the packages possibly may slide off the unloading chute onto the take-away conveyor 73 before the chute is refilled by another loading cycle, the chute is empty for only a few seconds at a time. Hence, the package exit opening 69, is substantially plugged by packages most of the time to retard the escape of the freezing medium.

After the last shelf, i. e. the bottom shelf, of a carrier 46 has been loaded, the latter is raised a final step, somewhat greater than the preceding step, to align its supporting arms 50 with the upper set of rails 51. Thereafter the lower plunger 56 is operated to advance the lower row of carriers to bring the succeeding carrier therein to the loading and unloading station. Simultaneous operation of the upper plunger 55 moves the raised carrier from and beyond the loading station into contact with the carrier immediately thereahead, and then advances the entire upper row of carriers the width of one carrier.

The mechanism for raising a carrier step-by-step, to successively position its shelves at the loading station, consists, in part, of two inverted U-shaped weights 75, one disposed closely adjacent each side of the sets of rails 51 and 52, with their depending legs 76 straddling the gangway 70 and the chute 71, and their side edges slidably mounted in vertical channel guides 77. A spring-biased latch 78 (Figure 7) projects from the inner side of the upper portion of each weight 75 in position to engage under and lift the corresponding supporting arm 50 of a package carrier which has been advanced on the lower rails 52 to the loading station. Hoisting cables 79, secured to the top of each weight, pass over corresponding pulleys 80 mounted above the upper rails 51, and thence in the same direction outwardly through apertures 81 in the wall 67 for connection to step-by-step hoisting mechanism, later described. The lower rails 52 and the upper rails 51 are appropriately cut away at the loading station both to enable the latches 78 to engage under the supporting arms 50 of a carrier and to provide clearance for these arms 50 and latches 78 during the ascent of a carrier. After the upper plunger 55 advances a raised carrier off of the lifting latches 78 and onto the lower flanges of the upper rails 51, the step-by-step hoisting mechanism permits the weights 75 to descend, by gravity, for engagement of the latches with the supporting arms of the succeeding carrier on the lower rails, which carrier has previously been advanced to the loading station by the lower plunger 56.

Figure 4:
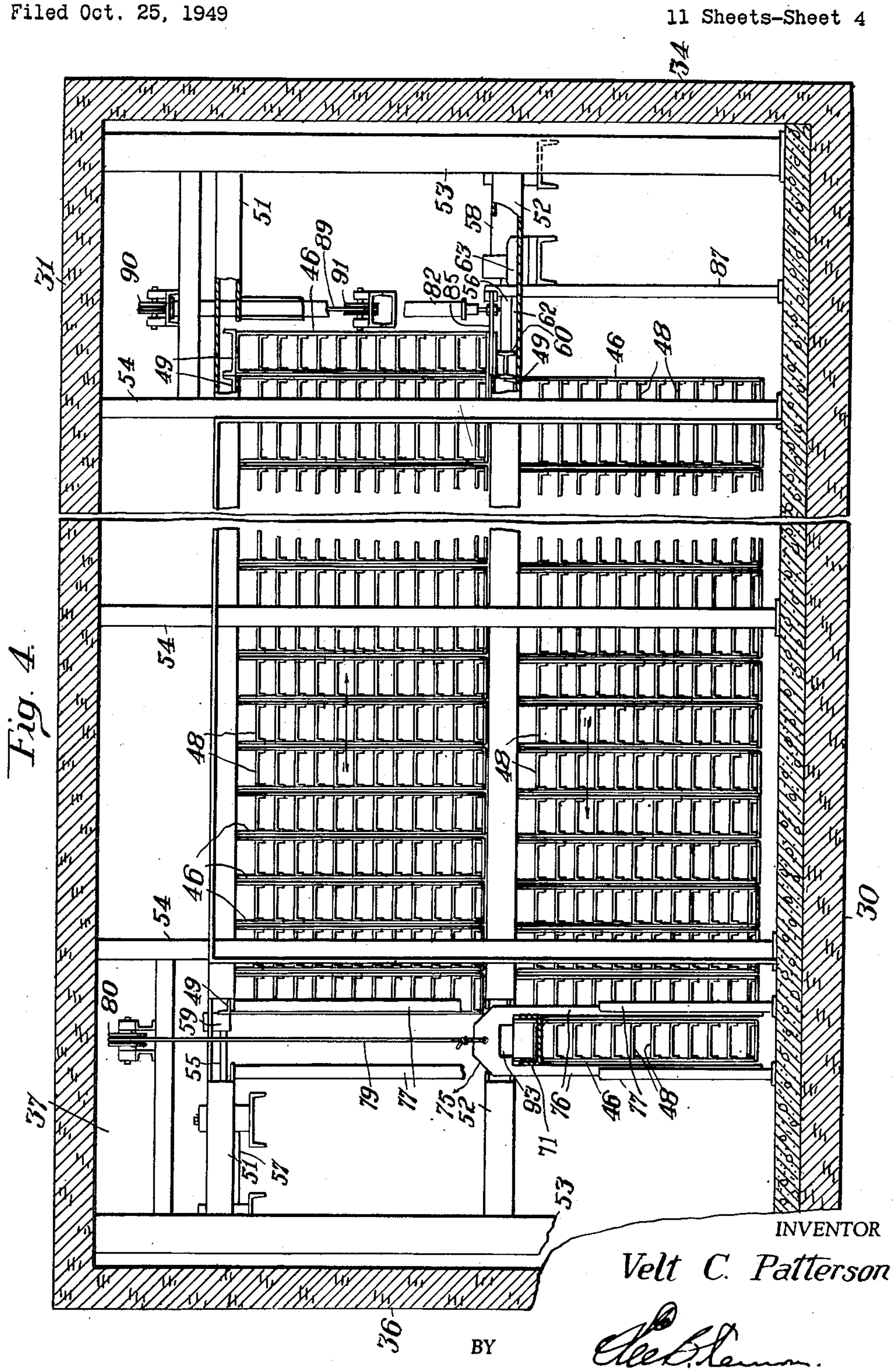
Figure 4 is a vertical sectional view taken on line 4—4 of Figure 2.
Figure 8:
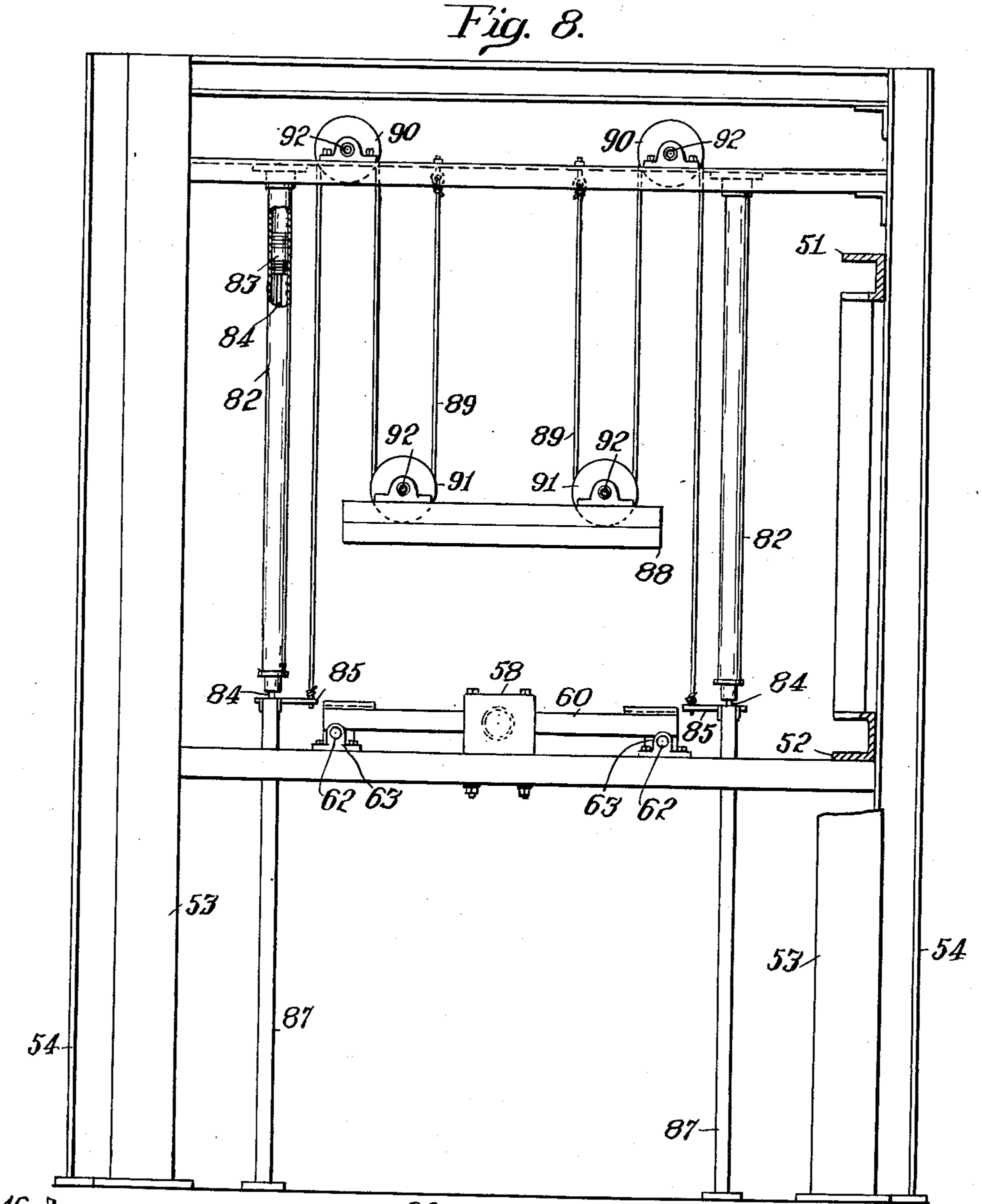
Figure 8 is an enlarged fragmentary view taken substantially on line 8—8 of Figure 2, in which certain portions are broken away to show details.
Figure 9:
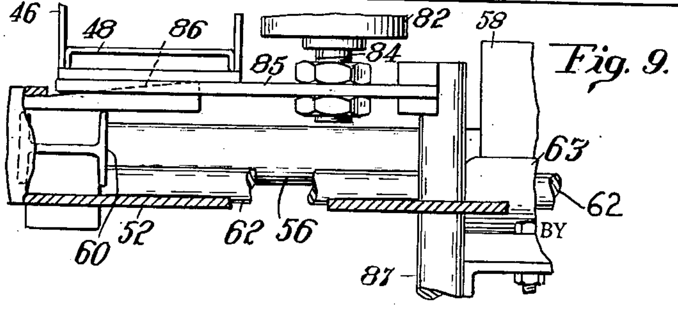
Figure 9 is an enlarged fragmentary view of still another portion of Figure 2.

The mechanism for lowering the foremost carrier from the upper rails, while a carrier is being raised at the loading station, comprises two vertically-disposed closed air cylinders 82 (Figure 8), each having a piston 83 therein and a piston rod 84 extending out of the lower end thereof. A carrier support 85 is mounted on the lower end of each piston rod 84 and projects immediately beneath a carrier which has been advanced to the limit of its travel on the upper rails 51. The lower flanges of the upper rails are appropriately cut away at the carrier-descent position (Figures 4 and 8) so that as the upper plunger 55 advances the upper row of carriers, the supporting arms 50 of the foremost carrier may pass downwardly through the cut away lower flanges of the rails 51. As the foremost carrier moves over the cut-out portion of the upper rails 51, the pusher bar 60 of the lower plunger 56 advances. This bar 60, when advanced, as shown in Figures 4 and 9, is disposed between the carrier supports 85 with the upper surface 86 of the bar on substantially the same level as the supports 85, when the latter are in their raised or upper position. This upper surface 86 of the pusher bar is slightly inclined, as shown in Figure 9, so that the bar 60 readily slides beneath a carrier to engage and support the same, without downward drop of the latter, as the carrier moves over the cut-out portion of the upper rails. Retraction of this bar 60 by the lower plunger 56 gradually transfers the weight of the carrier to the carrier supports 85 on the piston rods 84, which latter then lower the carrier, by gravity, to the lower rails 52, the upper flange of which is suitably cutaway at the carrier descent position (Figures 4, 8, and 9) to receive the carrier supporting arms 50. The piston rods 84 and the carrier supports 85 are guided during their vertical movement by vertical rods 87, which are slideably engaged by a conforming edge of the carrier supports 85.

The next advance of the lower plunger 56 pushes the lowered carrier off the supports 85 into contact with the carrier immediately thereahead (Figure 4), and then advances the entire lower row of carriers the full width of one carrier. Thus relieved of the weight of the lowered carrier, the piston rods 84 are retracted or raised, to receive the succeeding carrier from the upper row, by a counterweight 88 that is connected to the ends of the piston rods through a suitable, balanced system of cables 89 and fixed and travelling pulleys, 90 and 91, respectively (Figure 8). The air cylinders 82, in effect, serve as pneumatic checks and have their opposite ends vented through adjustable valves (not shown) to control the movement of the pistons 83 therein. For balancing purposes the adjacent ends of both cylinders 82 preferably are vented through a common valve (not shown). The control valve for the lower ends of the cylinders is so adjusted that the pistons 83 and corresponding rods 84 descend relatively slowly under the weight of a carrier in order to gently lower the latter to the lower rails 52. The control valve for the upper ends of the cylinders is so adjusted, however, that the pistons and piston rods, when relieved of the weight of a carrier, are rather rapidly retracted into their upper position, by the counterweight 88, so that the supports 85 can receive the succeeding carrier from the upper row, without such carrier dropping, as soon as the lower pusher bar 60 retracts.

It is evident that a carrier has a considerable period of time in which to be lowered, by the air cylinders, from the upper to the lower rails, since operation of the row-advancing plungers 55 and 56 must await the step-by-step ascent of a carrier at the loading station. The piston rods 84 must retract, or withdraw, into carrier receiving position, however, while the pusher bar 60 is in its advanced position supporting the next carrier to be lowered. Hence, the plunger motors 57 and 58 are operated to provide a dwell for the advanced position of their plungers, such dwell being of sufficient duration to permit complete retraction of the piston rods 84 by the counterweight 88 before the plunger 56 is retracted. In order, however, to completely insure movement of the carrier supports 85 into their upper, carrier receiving position before the pusher bar 60 retracts, the support-raising action of the counterweight 88 may be supplemented or even replaced by the properly timed introduction of hydraulic pressure into the lower ends of the cylinders 82 and suitable controls (not shown), operable by variations in such pressure, or by movement of the parts being raised, may be associated with the hydraulic motor 58 to prevent retraction of the row-advancing plunger 56 until the piston rods are fully retracted.

The moving parts of the carrier raising and carrier lowering mechanisms within the freezing chamber are provided with heaters to prevent the possibility of jamming because of the extremely low air temperature. The shafts which mount the pulleys 80, 90, and 91 each have an electric heating element 92 (Figures 7 and 8) disposed in an axial bore therethrough. The electrical connections for these elements 92 are not shown. The latch housings 93 (Figures 6 and 7) and the wall apertures 81 for the cables 79 are also surrounded by similar electric heating elements 92. These heating elements 92 serve to raise the temperature of the respective parts protected thereby to about 15° F. to provide for free and easy operation.

*The feeding mechanism*

Figures 10, 18:
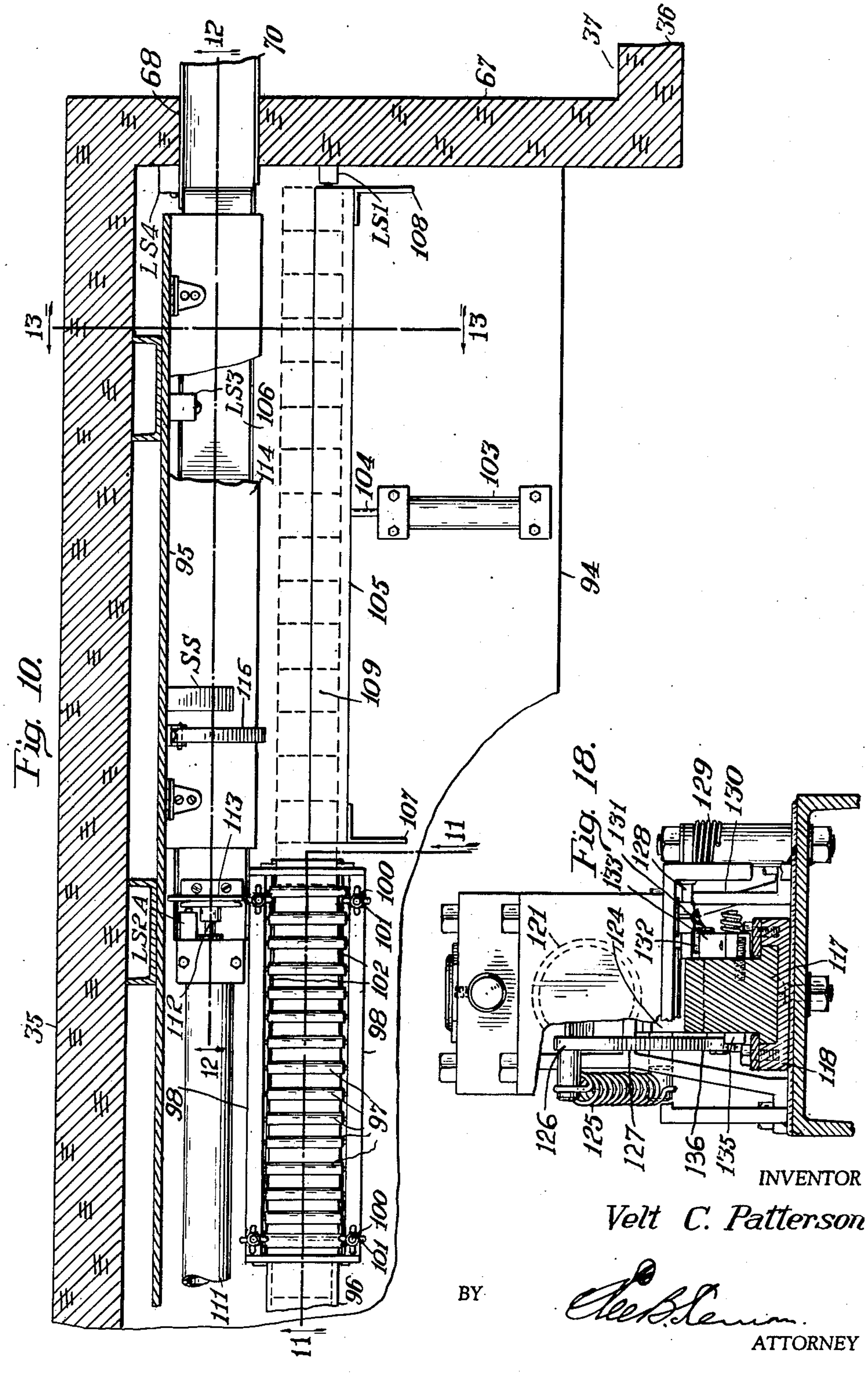
Figure 10 is an enlarged fragmentary plan view of the mechanism for feeding packages to be frozen into the machine.
Figure 18 is a sectional view taken on line 18—18 of Figure 16.

The mechanism for feeding separate shelf-loads of packages into the freezer, with simultaneous discharge of separate shelf-loads of frozen packages, is located under and on a table 94, that is disposed exteriorly against the end wall 35 of the freezing chamber. This table is provided with a vertical back panel or wall 95 (Figures 1, 10, 11, 12 and 13). Packages to be frozen are advanced, usually from filling and wrapping stations (not shown), and fed side-by-side to the freezer on a continuously running belt conveyor 96 arranged longitudinally along the central portion of the table 94 and having the upper flight of its belt disposed substantially flush with the table top. The conveyor 96, which is driven by any suitable source of power, terminates substantially midway of the length of the table 94, and there transfers the incoming packages carried by the upper flight of its belt to the smooth surface of the table top. The packages so transferred are then slid forwardly along the table top, by the advance of succeeding packages on the feeding conveyor 96, and accumulated in an advancing row (Figure 10). The forward movement of this accumulating row of packages is halted by contact of the foremost package in the row with a limit switch LS1 mounted on the wall 67. The distance between the terminal end of the feeding conveyor and the switch LS1 is proportioned to accommodate a thus accumulated row of packages at least equal to one shelf-load, i. e., to continue the previously mentioned example, a row 5 feet long consisting of 15 packages, each 4″ wide.

Figure 11:
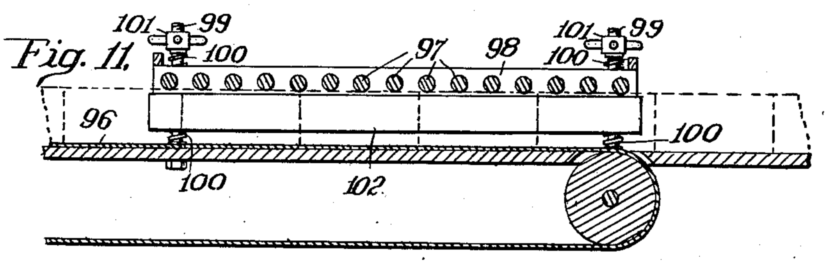
Figure 11 is a fragmentary sectional view taken on line 11—11 of Figure 10.
Figures 13, 14:
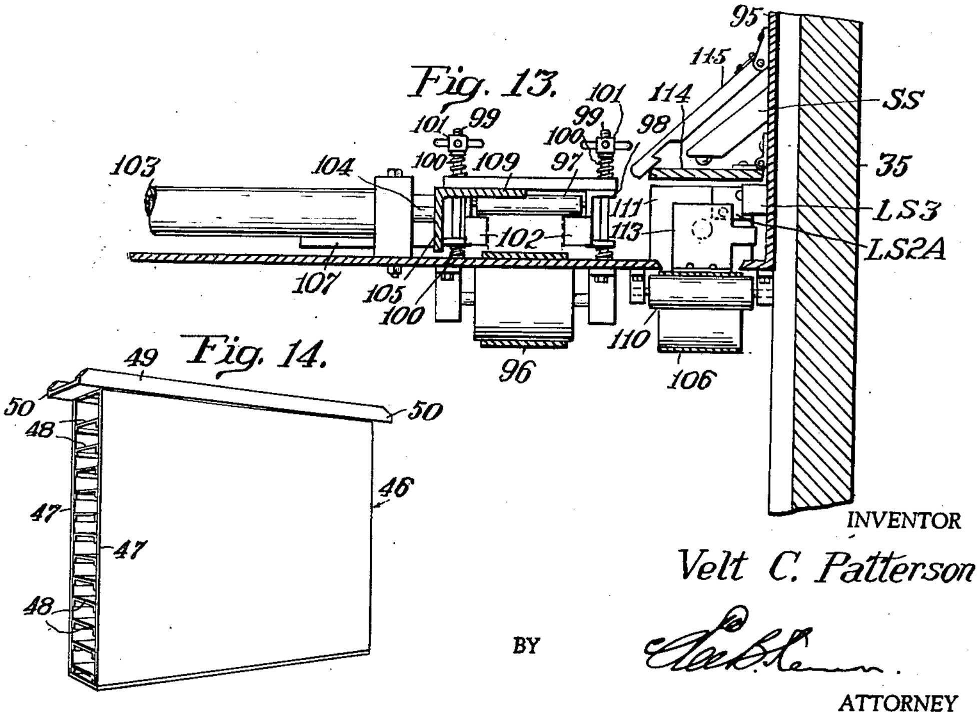
Figure 13 is a fragmentary sectional view taken on line 13—13 of Figure 10.
Figure 14 is a perspective view of a carrier on which packages are transported within the machine.

Spaced above the terminal portion of the feeding conveyor 96 is a series of horizontal transverse rollers 97 journalled in a generally rectangular frame 98 (Figures 10, 11 and 13). The frame 98 is adjustably mounted on bolts 99 secured to and projecting upwardly from the table top. Springs 100 are mounted on the bolts 99, between the frame 98 and the table top and between the frame 98 and adjusting nuts 101, to provide a resilient mounting for the frame. The vertical spacing between the rollers 97 and the upper flight of the conveyor 96 is such that the incoming packages pass beneath and are resiliently engaged by the rollers 97. Preferably the frame 98 is slightly inclined so that such vertical spacing gradually diminishes toward the terminal end of the feeding conveyor. Adjustment of the nuts 101 controls the pressure with which the rollers bear against the upper faces of the packages as they pass therebeneath. Slightly converging vertical plates 102, carried by the frame 98 on each side of the conveyor 96 and beneath the rollers 97, serve to confine the sides of the packages and thus prevent bulging under roller pressure.

The rollers 97 and plates 102 serve two purposes: one, to flatten bulging packages caused by heaped food contents to prevent subsequent bulging of the package by the freezing process and/or compact such food contents to eliminate heat insulating air spaces and: two, to provide sufficient friction between the packages and the belt of the feeding conveyor 96 to provide a more positive drive for sliding the transferred packages forwardly along the table top to the limit switch LS1. If the frame and rollers are sufficiently heavy, the top springs 100 may be omitted so that the weight alone of the frame and rollers provides the desirable package compression.

Figure 12:
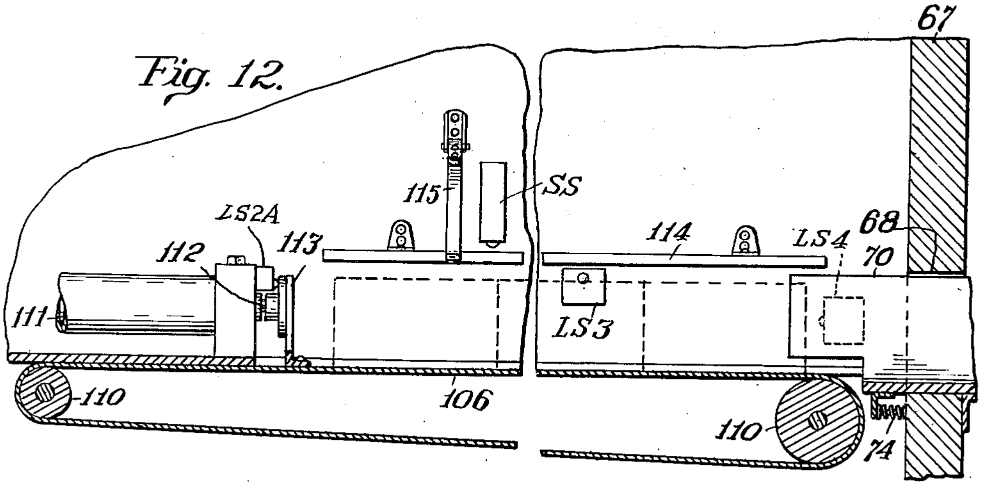
Figure 12 is a fragmentary sectional view taken on line 12—12 of Figure 10.

The limit switch LS1 is normally open and adapted to be closed by the foremost package in the accumulated row of packages. The closing of this switch energizes a solenoid valve SV1 (Figure 20) which controls the admission of pressure fluid to, and the xehausting of pressure fluid from, the opposite ends of a hydraulic or other fluid motor 103, which is disposed on the table top transversely of the accumulated row of packages. The motor 103 is provided with a plunger 104 having a pusher bar 105 substantially coextensive in length with the accumulated shelf-load row of packages. When the valve SV1 is deenergized the motor 103 positively maintains the plunger 104 in retracted position, but when the valve SV1 is energized the motor 103 positively advances the plunger 104. Hence, when the switch LS1 is closed by the foremost package, the pusher bar 105 effects lateral transfer of the accumulated shelf-load row of packages to a shelf-loading endless-belt conveyor 106 that is aligned with the package entrance opening 68. That end of the pusher bar 105 which is adjacent the terminal end of the feeding conveyor 96 is provided with a rearwardly extending flange, or wing 107, which stops further delivery of packages from the feeding conveyor during the operating cycle of the transfer plunger 104. The other end of the bar 105 is also provided with a rearwardly extending flange, or wing 108, to engage and maintain the limit switch LS1 closed during advance of the bar. The pusher bar 105 also is provided with a hold-down flange 109 which overhangs the pusher face of the bar and prevents upward buckling of the accumulated shelf-load row of packages during their transfer to the loading conveyor 106. The belt of this latter conveyor is mounted on two rollers 110 disposed beneath the table top with the upper flight of the belt located directly beneath a cut-out portion of the table top (Figures 10, 12, and 13). The terminal end of this conveyor 106 is located adjacent the outer-end of the loading gangway 70 (Figure 12).

A second normally open limit switch LS3 is mounted on the back wall 95 (Figure 10), in position to be engaged by the transfer pusher bar 105 at the end of the latter's advancing stroke. Closing of this switch is effective to energize a solenoid valve SV2 (Figure 20) which controls the admission of pressure fluid to, and the exhausting of pressure fluid from, the opposite ends of a second hydraulic motor 111 which is mounted on the table top and has a plunger 112 aligned with the shelf-loading conveyor 106. When the valve SV2 is deenergized the motor 111 maintains the plunger 112 in retracted position, but when the valve SV2 is energized the motor 111 positively advances the plunger 112. The forward end of the plunger 112 is attached to the upper flight of the belt of the loading conveyor 106 and also is equipped with a pusher plate 113, so that a shelf-load row of packages, transferred to the loading conveyor by the transfer pusher bar 105, is both carried and positively pushed onto the gangway 70 and through the entrance opening 68 upon advance of the plunger 112. The effective stroke of this plunger 112 is equal to the length of a shelf-load row of packages, so that a carrier shelf is loaded and unloaded upon each stroke. Closing of the switch LS3 also serves to deenergize the solenoid valve SV1, by control means later described, so that the transfer plunger 104 retracts as the loading plunger 112 advances. At the end of the advancing stroke of the loading plunger, the pusher plate 113 engages the outer end of the loading gangway 70 to effect the previously described slight inward movement of the latter. At the same time the pusher plate 113 engages and closes a normally open limit switch LS4 which deenergizes the solenoid valve SV2, by control means later described, thereby causing the retraction of the loading plunger 112 for another transfer and loading cycle of the plungers 104 and 112.

Another normally open limit switch LS2A is located adjacent the forward end of the motor 111 in position to be engaged and closed by the rear face of the pusher plate 113 when the loading plunger 112 is fully retracted. This switch LS2A is connected in series with the switch LS1 so that contact of a package with the latter will not energize the solenoid valve SV1, and thereby cause the transfer plunger 104 to advance, unless the loading plunger 112 is in fully retracted position.

Pivotally mounted on the back wall 95 and overhanging the loading conveyor 106 is a horizontal plate 114 (Figure 10), substantially coextensive in length with the loading conveyor. A normally open safety switch SS is mounted above the plate 114 in position to be engaged and closed by upward movement thereof. This switch SS, when closed, energizes a relay SR (Figure 21) which opens a switch in the main lines which supply power to the machine. If, during the loading stroke of the plunger 112, the row of packages being loaded buckles upwardly, the plate 114 is lifted, thereby closing the switch SS to thus stop the machine and any further advance of the loading plunger. Another suitable type of safety switch (not shown) is a mercury switch which would be mounted directly on the plate 114 and disposed to be tilted to closed position by upward movement of the plate. A latching device 115 automatically serves to maintain the plate 114 in raised position, and thereby the switch SS closed, until the buckling has been corrected, when latching device 115 is released manually.

*The step-by-step carrier raising mechanism*

Figures 15, 16, 17:
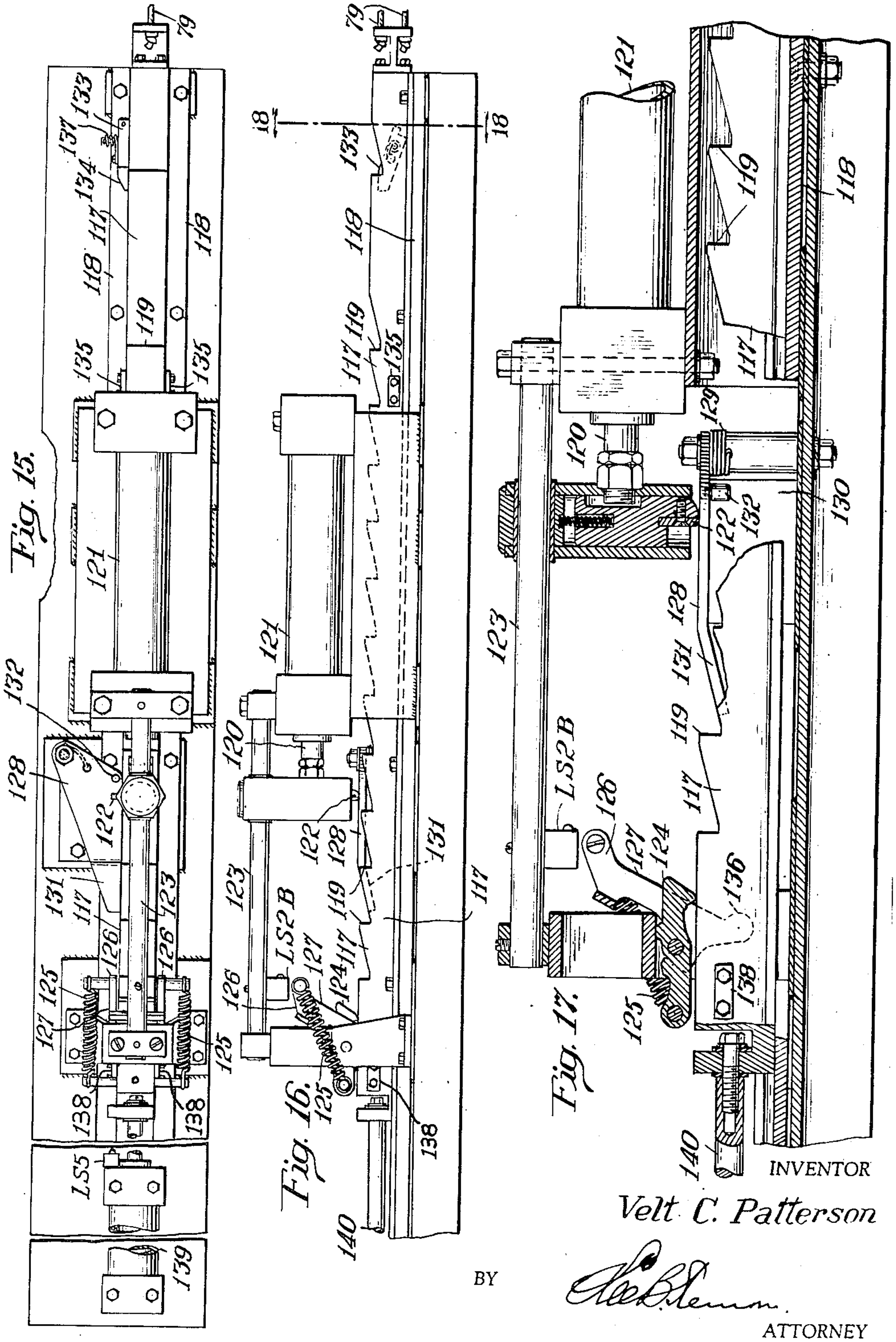
Figure 15 is a plan view of the mechanism for raising the package carriers step-by-step during a portion of their travel within the machine.
Figure 16 is a fragmentary elevational view of the mechanism shown in Figure 15.
Figure 17 is an enlarged fragmentary view, partly in section, of a portion of the mechanism shown in Figure 16.

The cable hoisting mechanism for raising each carrier step-by-step, for the loading and unloading of its shelves, is mounted in a closed compartment 116 (Figure 1) that is located at the upper portion of the vertical panel or back wall 95 of the table 94. This mechanism comprises a longitudinally-disposed horizontal rack 117, slidably mounted in a guiding channel 118 and having the carrier-hoisting cables 79 attached to one end thereof (Figures 15, 16, 17 and 18). The distance between adjacent rack teeth 119 is equal to the distance through which a carrier is raised in one step, i. e. equal to the vertical spacing of carrier shelves. The rack 117 is positively moved step-by-step in a direction to raise a carrier (to be loaded) by a plunger 120, operated by a hydraulic motor 121 and having a spring-pressed rack-driving pawl 122. The housing for this pawl preferably is slidably mounted on a guide rod 123. A spring-biased holding latch 124 normally is engaged with the rack teeth to prevent return movement of the rack 117 by the weight of a carrier being raised and also the weights 75. At one end of the latch, springs 125 are attached to the longer arms 126 of a bell crank 127, which is pivoted on the same axis as the latch 124 and can be oscillated between two positions. In the normal position of the bell crank 126 the latch 124 is biased toward engagement with the rack teeth, as shown in Figures 16 and 17. In the other position (not shown) of the bell crank 126, however, the latch 124 is biased out of engagement with the rack teeth.

Figure 20:
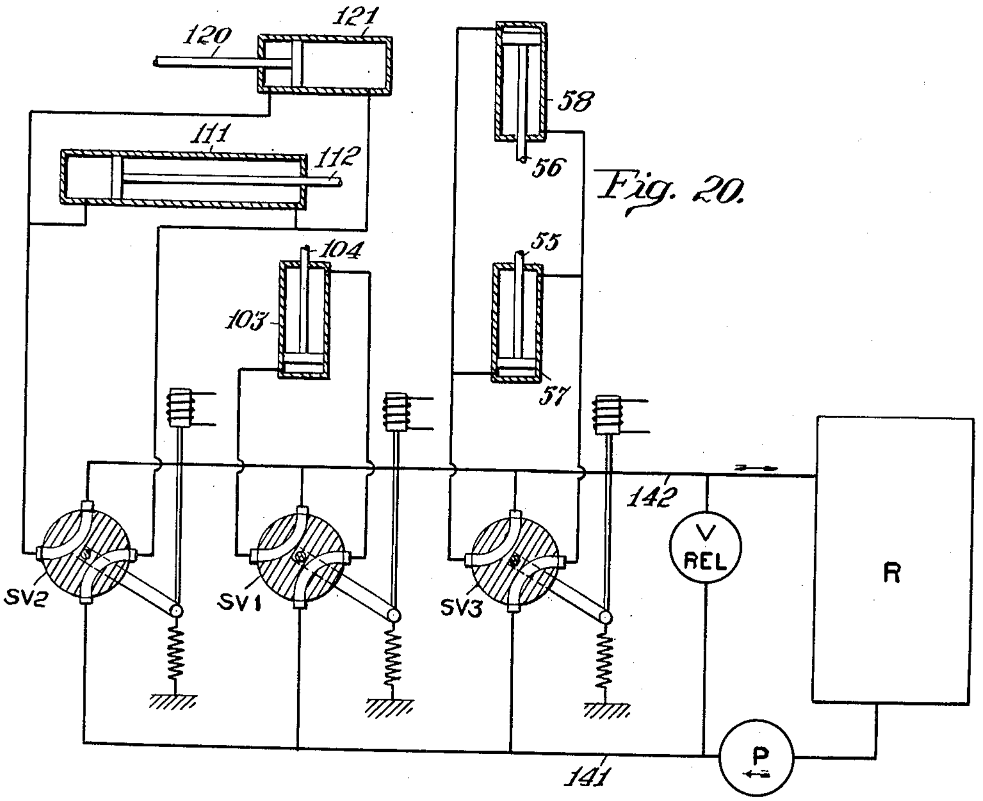
Figure 20 is a schematic diagram of the hydraulic system for operating the machine.

The motor 121 is connected in parallel into the same lines which supply pressure fluid to, and exhaust pressure fluid from, the loading plunger motor 111 (as shown in Figure 20). The fluid connections to the motor 121 are reversed, however, so that when the loading plunger 112 is retracted, the carrier-raising plunger 120 is advanced, and vice versa. Accordingly, the carrier-raising plunger 120 is advanced upon the return stroke of the loading plunger 112. For reasons later described the full stroke of the carrier raising plunger 120 is slightly greater than three times the distance necessary to raise a carrier one step, so that normally it is necessary to prevent the plunger 120 from moving the rack 117 except during the last third of the former's advancing stroke. This lost motion drive is effected by means which prevent the driving pawl 122 from engaging the first two rack teeth encountered during the advancing movement of the plunger 120. Such means comprises a horizontal plate 128 pivoted about a vertical axis and urged by a spring 129 to maintain a straight edge of the plate in contact with a side of the rack 117. The upper horizontal edge of a vertically mounted plate 130 slideably supports portions of the plate 128 remote from the latter's pivot. That edge of the plate 128 which contacts the side of the rack has a flat upper surface portion disposed slightly above the rack teeth. This flat portion is coextensive, in length, with two rack teeth and merges into a downwardly inclined portion 131 (Figure 17). The driving pawl 122 projects outwardly from one side of the rack over this plate 128 (Figures 15 and 18), so that as the pawl 122 advances it rides upon the raised flat portion of the plate 128 until two rack teeth have been passed, at which point the pawl rides down the inclined portion 131 of the plate into engagement with the third rack tooth. Continued advance of the plunger 120 then moves the rack forward a distance equal to that required to raise the carrier being loaded one step, i. e. one rack tooth. When the carrier-raising plunger 120 retracts, upon the advance of the loading plunger 112 in the next shelf-loading cycle, the holding latch 124 maintains the rack in its thus advanced position. During the last two thirds of the retraction stroke of the plunger 120, the driving pawl 122 rides up the inclined portion 131 of the plate, completely out of engagement with the rack teeth.

A normally open limit switch LS2B (Figures 16 and 17) is mounted in position to be engaged and closed by the forward face of the housing for the driving pawl 122 when the plunger 120 is in fully advanced position. This limit switch LS2B is connected in series with limit switches LS1 and LS2A. Hence, the transfer plunger 104 can advance to start a loading cycle only if the carrier-raising plunger 120 is in fully advanced position.

Figure 19:
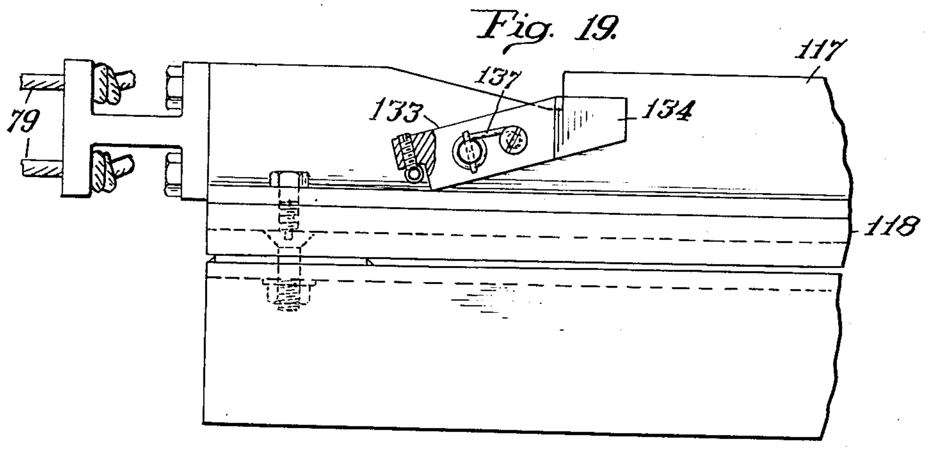
Figure 19 is an enlarged fragmentary rear elevational view of a portion of the mechanism shown in Figure 16.

The step-by-step carrier raising operation is continued until all the shelves have been loaded. After the last shelf, i. e. the bottom shelf, has been loaded, and during the retraction stroke of the loading plunger 112, the carrier must be raised a final step, three times greater than the preceding step, in order to place the carrier supporting arms 50 in line with the upper pair of guide rails 51. Hence, means must be provided to throw out the tooth-covering plate 128 and thus enable the driving pawl 122 to engage the first rack tooth encountered in the former's advancing movement. Such means comprises a vertical roller 132 depending from the underside of the plate 128 and a cam 133 (shown best in Figure 19) mounted on the side of the rack 117, adjacent the rearward end thereof, in position to engage the roller. An inclined wedging surface 134 on this cam 133 engages the roller 132 and throws out the plate 128 from tooth covering rack engagement during the final portion of that advancing stroke of the plunger 120 next previous to the final carrier-raising stroke. Hence, upon the initiation of this final stroke the driving pawl 122 immediately engages the first rack tooth encountered and moves the rack through the distance necessary to raise a carrier its final step, i. e. about three times greater than the preceding shelf-indexing steps.

A limit switch LS5 (Figure 15) is mounted in position to be engaged by the forward end of the rack when the latter reaches its final limit of travel in the act of raising a carrier. Actuation of the switch LS5 by the rack breaks the circuit which includes the loading mechanism and carrier-raising switches LS1, LS2A, LS2B, LS3, and LS4 and simultaneously closes a circuit which energizes a solenoid valve SV3 (Figure 20). This valve SV3 controls the admission of pressure fluid to, and the exhausting of pressure fluid from, the opposite ends of the row-advancing plunger motors 57 and 58. When the valve SV3 is deenergized, these motors 57 and 58, which are connected in parallel to the pressure fluid supply and exhaust lines, maintain their respective plungers 55 and 56 in retracted position. When the valve SV3 is energized the motors 57 and 58 advance their respective plungers to advance the carrier rows. Hence, actuation of the switch LS5 by the rack causes the plungers 55 and 56 to advance. An adjustable, switch operating timer (Figure 21) is connected in parallel into the circuit which energizes the valve SV3. This timer is adjusted to operate a timer switch TS (Figure 21) to interrupt the valve energizing circuit at the end of a predetermined period of time after the circuit is closed by the switch LS5, to thus deenergize the valve SV3 and cause the plungers 55 and 56 to retract. As an example of a suitable time period for valve energization, the timer may be set to interrupt the circuit at the end of six seconds. Since, for example, four seconds may be sufficient to complete the advancing stroke of the plungers 55 and 56, a six second period provides a dwell, for the advanced position of these plungers, of at least two seconds. This two second time interval is more than sufficient time for the counterweight 88 to raise the carrier supporting arms 85 into position to receive the succeeding carrier to be lowered before the pusher bar 60 is retracted. Simultaneously with the interruption of the valve energizing circuit the timer switch TS closes a by-pass around those contacts of switch LS5 which are in circuit with the loading-mechanism and carrier raising switches LS1, LS2A, LS2B, LS3, and LS4, so that the closing of limit switch LS1 by the incoming packages will initiate another carrier loading cycle.

During the final forward movement of the rack, cams 135 mounted on opposite sides of the rack contact the shorter arms 136 of the bell crank 127 and pivot the latter out of its normal position. The holding latch 124 is thus biased out of engagement with the rack. At the same time the cam 133 passes the roller 132 and permits the plate 128 to return to tooth-covering rack engagement. The plate throw-out cam 133 is pivoted on a horizontal axis and maintained in an upwardly inclined position by a spring 137. Hence, when the plunger 120 retracts during the first shelf-loading cycle for a carrier, the inclined upper surface of the cam 133 engages and rides under the roller 132 without throwing out the plate 128. Accordingly, the driving pawl 122 rides up on the plate 128. The rack 117 is then completely free to be dragged back to starting position by the weights 75, the latches 78 of which then engage with the supporting arms 50 of another carrier. At the end of this return movement of the rack the other cams 138, mounted on opposite sides of the rack, adjacent the forward end thereof, engage the shorter arms 136 of the bell crank and pivot the latter back to its normal position, thus rebiasing the holding latch 124 into rack engagement. It is obvious that equivalent means for biasing the holding latch into and out of rack engagement, e. g. a solenoid controlled by suitable switches that are operated by terminal movements of the rack, may be employed instead of the cam operated construction shown.

The return movement of the rack 117 and weights 75 is pneumatically cushioned by an air cylinder 139 (Figure 15), which is mounted in alignment with the rack and has the end of its piston rod 140 connected to the forward end of the rack. Return movement of the rack also deactuates the limit switch LS5, thus interrupting the timer circuit. This timer is of the type which, by deenergization, resets the timer switch TS (Figure 21) to closed position in the valve (SV 3) energizing circuit.

*The hydraulic system*

The hydraulic system, schematically shown in Figures 20, comprises a constant pressure line 141 and an exhaust line 142. Pressure fluid is supplied to the pressure line from any suitable source, such as a pump P which may draw fluid from a reservoir R into which the exhaust line empties. In order to avoid excessive pressures, a suitable adjustable pressure-relief valve V may be connected conventionally across the two lines 141 and 142 on the outlet side of the pump P. The same result may be obtained by means of a variable delivery pump (not shown), of the type which ceases delivery upon development of a predetermined pressure. Pressure fluid is supplied to, and exhausted from the several hydraulic motors, from and to the supply and exhaust lines, respectively. Operation of the motors 57, 58, 103, 111, and 121 is controlled by the valves SV1, SV2, and SV3, as previously described. Such valves are shown in Figure 20 as spring-biased and directly operated by solenoids. It will be understood, however, that these valves may be of the type which are directly operated by fluid pressure under the control of solenoid operated pilot valves. Preferably the pump P, reservoir R, pressure-relief valve V, and solenoid valves are mounted in closed compartments under the table 94.

It will be seen that the production rate of the machine depends, for the most part, upon the rate of advance and retraction of the various plungers. This latter rate, in turn, is proportional to the capacity, i. e. volume per unit time, of the pump P, assuming the latter develops sufficient pressure.

*The automatic controls*

Figure 21:
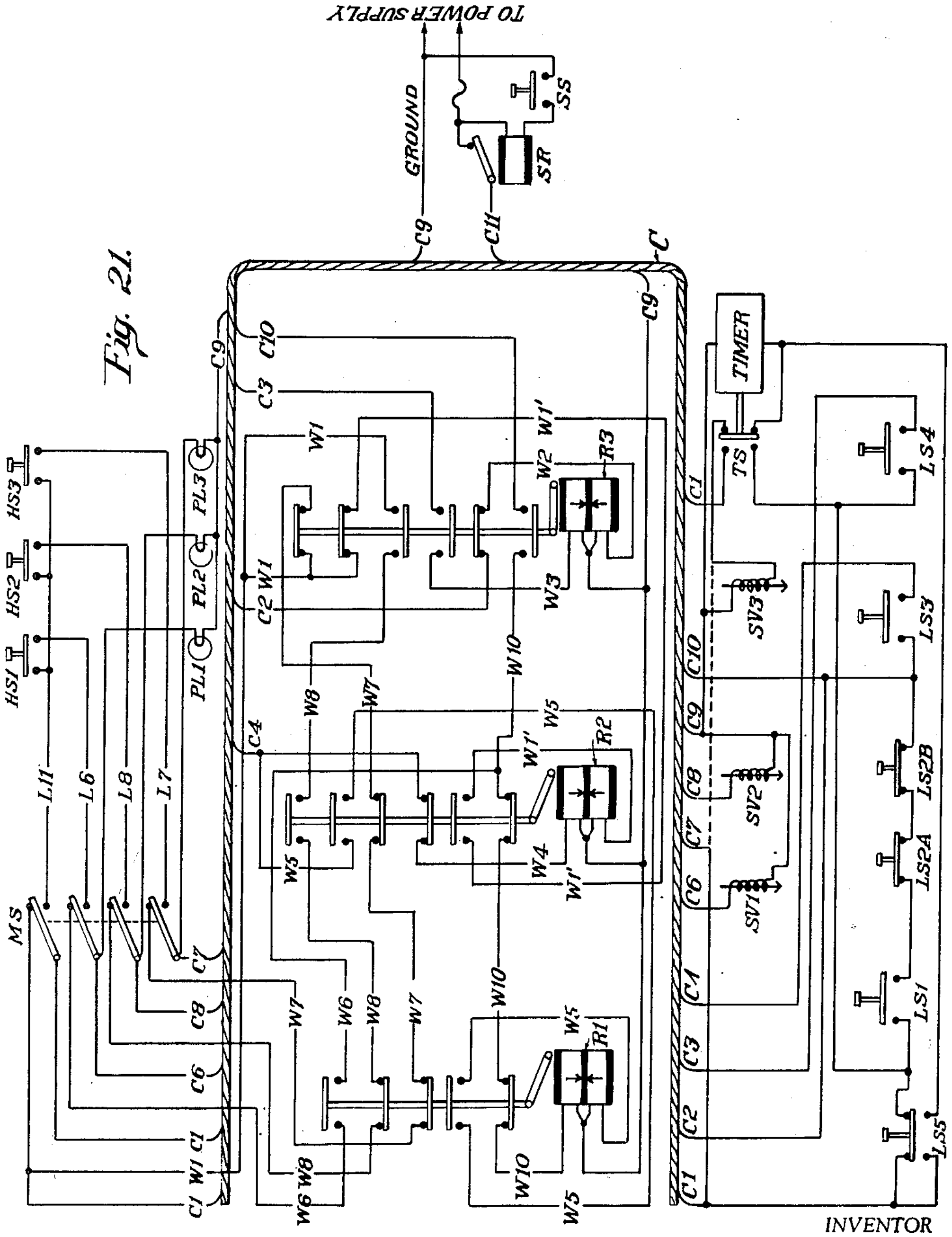
Figure 21 is a wiring diagram of the electrical controls for the machine.

The operation of the automatic controls is best shown in the wiring diagram illustrated in Figure 21. The sequential energization and deenergization of the solenoid valves SV1 and SV2 is effected by three differential gang-switch relays R1, R2, and R3 which are controlled by the limit switches LS1, LS2A, LS2B, LS3, and LS4. These relays are of the type which are moved from one position to the other position by a current impulse, i. e. the current supplied to either one of the two relay-operating coils is immediately interrupted by operation of the relay. In order to simplify the wiring diagram numerous wires have been grouped in a multi-conduit cable, generally indicated at C, and the taps to each separate conduit indicated by a common reference character.

At the start of the automatic operation of the freezer, all of the relays and limit switches are in the positions shown in Figure 21 and the plungers in the positions shown in Figure 20. Incoming packages contact and close limit switch LS1, thus closing the energizing circuit (C11, C1, LS5, LS1, LS2A, LS2B, C2, W2, C9) for the lower operating coil of relay R3 and causing the latter's gang switch to move up. The up position of relay R3 closes the energizing circuit (C11, D1, LS5, LS1, LS2A, LS2B, C10, W10, C9) for the upper operating coil of relay R1 and causes the latter's gang switch to move down. With relay R1 down, R2 up, and R3 up the energizing circuit (C11, C1, LS5, LS1, LS2A, LS2B, C10, W10, W6, C6, C9) for solenoid valve SV1 is closed. Hence, the transfer plunger 104 advances to transfer a shelf-load of packages to the loading conveyor 106 and at the end of its stroke closes limit switch LS3. During the advance of the plunger 104 the flange 108 on the pusher bar 105 maintains limit switch LS1 closed. The closing of limit switch LS3 closes the energizing circuit (C11, C1, LS5, LS1, LS2A, LS2B, LS3, C4, W4, C9) for the upper operating coil of relay R2, thus causing the latter's gang switch to move down. The down position of relay R2 closes the energizing circuit (C11, C1, LS5, LS1, LS2A, LS2B, LS3, C4, W5, C9) for the lower operating coil of relay R1, thus causing the latter's gang switch to move up. With relay R1 up, R2 down, and R3 up the energizing circuit for solenoid valve SV1 is opened, thus causing the transfer plunger 104 to retract, and the energizing circuit (C11, W1, W8, C8, C9) for solenoid valve SV2 is closed, thus causing the loading plunger 112 to advance, to load a shelf-load of packages, and the carrier-raising plunger 120 to retract. Limit switches LS2A and LS2B are opened at the beginning of this movement of the plungers 112 and 120, so that the reclosing of limit switch LS1 by another package cannot possibly effect advance of the transfer plunger 104 until the plungers 112 and 120 have returned to fully retracted and fully advanced positions, respectively.

The closing of limit switch LS4, at the end of the advancing stroke of the loading plunger 112, closes the energizing circuit (C11, C1, LS5, LS4, C3, W3, C9) for the upper operating coil of relay R3 thus moving the latter's gang switch down. The down position of relay R3 closes the energizing circuit (C11, W1, W1', C9) for the lower operating coil of relay R2, thus moving the latter's gang switch up. With relay R1 up, R2 up, and R3 down the energizing circuit for solenoid valve SV2 is open. Hence, the loading plunger 112 retracts and the carrier-raising plunger 120 advances to raise a carrier one step. After the limit switches LS2A and LS2B have been closed by the complete retraction of the loading plunger and the complete advance of the carrier-raising plunger, respectively, the closing of limit switch LS1 by another package initiates another shelf-loading and carrier-raising cycle.

When the rack 117 reaches its final limit of travel it contacts and actuates limit switch LS5, thereby opening the circuit which includes limit switches LS1, LS2A, LS2B, LS3, and LS4 to prevent operation of and maintain the plungers 104 and 112 in their retracted position and the plunger 120 in its advanced position. At the same time the energizing circuit (C11, C1, LS5, C9) for solenoid valve SV3 is closed, thereby causing the plungers 55 and 56 to advance and push the upper and lower rows of carriers in opposite directions. Included in this energizing circuit for solenoid valve SV3 is a switch TS actuated by an electric timer that is connected in parallel with the valve. The timer, when energized, maintains the timer switch TS in valve circuit closing position for a predetermined time interval (6 seconds, to continue the previously described example) and then move the timer switch TS to open the solenoid valve SV3 energizing circuit, thus causing the plungers 55 and 56 retract. At the same time the timer switch TS closes a bypass around those contacts of limit switch LS5 which are in the circuit with the limit switches LS1, LS2A, LS2B, LS3, and LS4, so that another carrier-loading cycle may be initiated. This bypass is necessary because limit switch LS5 will not be disengaged by the rack 117, to thereby close the circuit which includes the carrier loading limit switches, until the carrier-raising plunger 120 is retracted to release the rack for rearward movement by the descent of the weights 75. This bypass is opened by the timer switch TS, however, upon deenergization of the timer by the actuation of limit switch LS5 when the latter is released by the forward end of the rack.

The automatic controls of the machine may be disconnected, and the solenoid valves SV1, SV2, and SV3 operated by manually-operable switches HS1, HS2, and HS3, by moving the gang switch MS to down position. When the switch MS is down, the automatic control circuits are open and the circuits to the switches HS1, HS2, and HS3 are closed. Hence, when switch HS1 is closed, an energizing circuit (C11, L11, L6, C6, C9) for solenoid valve SV1 is closed. Similarly switch HS2 controls an energizing circuit (C11, L11, L8, C8, C9) for solenoid valve SV2 and switch HS3 controls an energizing circuit (C11, L11, L7, C7, LS5, TS, C9) for the timer and solenoid valve SV3. Preferably limit switch LS5 is included in this latter circuit so that solenoid valve SV3 cannot be energized, and the plungers 55 and 56 thereby advanced, unless the rack 117 is in its fully advanced position. An alternate connection which does not include limit switch LS5 and the timer, may be employed, however as shown by the dotted line in Figure 21. Pilot lights PL1, PL2, and PL3, when lighted, indicate, respectively, when the solenoid valves SV1, SV2, and SV3 are energized. Closing of the safety switch SS closes the energizing circuit of the safety relay SR, thus interrupting the power supply to the machine.

Although a preferred embodiment of this invention has been disclosed, it is realized that various changes and modifications which retain the principles of the invention will be apparent to one skilled in the art. Therefore, the invention encompasses all modifications which come within the spirit and scope of the following claims.

I claim:

1. A conveyor system for use in freezing a pre-packaged food product, the said system operating to move the packaged food products into, through and out of the freezing chamber, and comprising: a plurality of package carriers in said chamber, each having at least one open-ended horizontal shelf adapted to support at least one package to be frozen; means for moving said carriers step by step in a closed circuit within said chamber with said shelves extending transversely of the direction of carrier movement, said circuit comprising superimposed horizontal reaches connected at each of their ends by a vertical reach; a carrier shelf loading and unloading means adjacent one end of said circuit; means defining a package entrance opening and a package exit opening in said chamber disposed on opposite sides of one of said vertical reaches; and means for introducing a shelf-load row of packages to be frozen through said entrance opening onto a carrier shelf while the latter is at said entrance opening, and for unloading a shelf load row of frozen packages from said carrier through said exit opening, said last-mentioned means including pusher means mounted adjacent said chamber for driven reciprocating movement in substantial alignment with said openings.

2. A system as defined by claim 1 in which each package carrier comprises a plurality of vertically stacked open-ended horizontal shelves extending transversely of the carrier for supporting a row of packages to be frozen.

3. A conveyor system for use in freezing a pre-packaged food product, the said system operating to move the packaged food products into, through, and out of the freezing chamber, and comprising: a plurality of package carriers supported in said chamber for movement in an endless circuit, each of said carriers having a plurality of horizontal open-ended shelves each adapted to support a row of packages to be frozen; said chamber having a package entrance opening and a package exit opening disposed in opposite chamber walls; means for successively presenting said shelves of each of said carriers between said openings substantially in alignment therewith; and means including pusher means mounted for reciprocatory motion in substantial alignment with said openings for successively advancing a row of packages to be frozen through said entrance opening into said chamber and onto a carrier shelf and for unloading a row of packages from a carrier shelf, each said advance being equal in distance to the length of a shelf-load row of packages.

4. A conveyor system for freezing a pre-packaged food product, the said system operating to move the packaged food products into, through, and out of the freezing chamber, and comprising: means for transporting packages to be frozen through said chamber, said means including the combination of upper and lower parallel pairs of horizontal rails within said chamber, a plurality of package carriers suspended for slideable movement on each of said pairs and adapted to be advanced therealong in a row, pusher means for intermittently and simultaneously advancing said rows in opposite directions, said pusher means including a power-operated plunger acting on the rearward end of the lower row between the lower pair of rails and having an upper surface disposed above the carrier supporting surfaces of said lower rails, said upper surface, when the plunger is advanced, being positioned directly below a carrier as the latter is advanced off the ends of the upper rails, to receive and support a said carrier, and means for gradually lowering a said carrier from said plunger to said lower rails upon retraction of said plunger.

5. Article feeding mechanism for a machine adapted to successively receive and operate upon rows of articles, each said row consisting of the same predetermined number of articles, said mechanism comprising: an endless-belt feeding conveyor adapted to receive and carry articles in a single row; means defining a substantially horizontal article-supporting surface extending forwardly from the discharge end of said conveyor and adapted to receive articles therefrom, the friction of said conveyor belt against the articles carried thereon being sufficient to slide at least a predetermined number of articles forwardly on said surface in an accumulated row; a stop to halt the advance of said accumulated row; pusher means for transferring a row, consisting of said predetermined number of articles, laterally from said accumulated row; and means for longitudinally moving said transferred row of articles a distance at least equal to the length thereof, said last mentioned means including an endless conveyor belt and a power driven plunger disposed substantially parallel to the flights of said belt with the forward end of said plunger secured thereto.

6. The structure defined in claim 5 in which the mechanism is adapted to feed prismatically packaged food products to a freezing machine and including: a substantially horizontal series of parallel rollers resiliently suspended for vertical movement and disposed transversely over the terminal portion of the feeding conveyor, the normal spacing between the underside of said rollers and the belt of said conveyor being somewhat less than the thickness of the packages carried on said belt, whereby said packages are somewhat flattened by passage beneath said rollers and the friction between said packages and said conveyor belt is increased.

7. The structure defined in claim 5 including: a limit switch associated with the stop, said switch being adapted to be contacted and actuated by the foremost article in the accumulated row; and means controlled by said switch for operating said pusher means.

8. The structure defined in claim 5 including: a limit switch associated with the stop, said switch being adapted to be contacted and actuated by the foremost article in the accumulated row; means controlled by said switch for operating the pusher means; and flange means on said pusher means for contacting and maintaining said switch in actuated position after the transferring stroke of said pusher means has been initiated by said foremost article.

9. The structure defined in claim 5 including: a limit switch associated with the stop, said switch being adapted to be contacted and actuated by the foremost article in the accumulated row; means controlled by said switch for operating the pusher means; flange means on said pusher means for contacting and maintaining said switch in closed position after the transferring stroke of said pusher means has been initiated by said foremost article; a second limit switch adapted to be engaged and operated by a forward portion of said pusher means at the end of the latter's transferring stroke; means controlled by said second switch for operating the means for longitudinally moving the transferred row; and means controlled by said second switch for effecting the retracting stroke of said pusher means.

10. An article treating apparatus comprising: a treatment chamber; a plurality of article carriers supported in said chamber for movement in an endless circuit having a vertical reach disposed between the adjacent ends of upper and lower horizontal reaches, each of said carriers having a plurality of vertically spaced horizontal shelves each adapted to support at least one article; means adjacent said vertical reach for loading said carrier, said means including power-driven means for introducing articles into said chamber and for loading at least one article on a carrier shelf; and means for successively raising said carriers in a step-by-step movement past said loading means to successively position the shelves thereof in loading position, said raising means comprising: lifting means adapted to successively engage and support said carriers at the lower end of said vertical reach; a slideably mounted rack connected to said lifting means for raising the latter upon advance of said rack, the spacing between adjacent rack teeth corresponding to the vertical spacing between adjacent said carrier shelves; a power-driven plunger mounted parallel to said rack and having a pawl adapted to engage and advance said rack a distance corresponding to one tooth upon movement of said plunger in one direction; a rack holding latch; and means connected to said power-driven shelf-loading means for effecting movement of said plunger in said one direction while said shelf-loading means is retracting and for effecting movement of said plunger in the other direction while said shelf-loading means is advancing.

11. The structure defined in claim 10 in which the rack advancing stroke of the plunger is at least twice as great as the vertical spacing between adjacent carrier shelves and including: means for normally preventing engagement of said plunger pawl with said rack during a portion of said plunger stroke; and means carried by said rack for rendering said last mentioned means inoperative upon the final rack advancing stroke of said plunger, whereby said final stroke raises a carrier a step greater than the preceding steps.

12. The structure defined in claim 10 including means operable by the terminal advancing movement of the rack for rendering the rack holding latch inoperative and operable by the terminal returning movement of said rack for rendering said rack holding latch operative.

13. The structure defined in claim 10 in which the rack holding latch is spring biased and including: a bell crank connected to one end of said spring for reversing the bias on said latch; and abutment means on said rack for contacting said crank and reversing said bias at both ends of travel of said rack.

14. The structure defined in claim 10 including means for raising the pawl completely out of engagement with the rack upon movement of the plunger in the other direction.

15. Article treating apparatus comprising: a treatment chamber; a plurality of article carriers therewithin, each having a plurality of vertically spaced open-ended horizontal shelves adapted to support at least one article to be treated; means for moving said carriers in a closed circuit within said chamber, said circuit including superimposed horizontal reaches connected by a vertical reach at each of their ends, said means including power-driven means for intermittently advancing said carriers in opposite directions along each of said horizontal reaches and power-driven means for effecting step-by-step vertical movement of said carriers along said vertical reach; loading means adjacent said vertical reach, said step-by-step vertical movement of said carriers being effective to successively position the shelves thereof adjacent said loading means; conveyor means for feeding articles to be treated to said apparatus in a continuous row; automatic means actuated by the foremost article in said row for loading at least one article onto a carrier shelf when the latter is positioned adjacent said loading means, and for thereafter actuating said step-by-step carrier moving means to move a carrier one step vertically; automatic means actuated in the terminal step movement of a carrier along said vertical reach for rendering both said loading and step-by-step vertical movement means inoperative and for actuating said carrier advancing means; and timer means associated with said last mentioned automatic means and operable after a predetermined period for automatically rendering both said loading and step-by-step vertical movement means operative.

16. The structure defined by claim 15 in which the automatic loading means is simultaneously effective to unload at least one article from the carrier shelf being loaded, the number of articles simultaneously loaded and unloaded being equal.

References Cited in the file of this patent

UNITED STATES PATENTS

| Number | Name | Date |
|---|---|---|
| 607,470 | Richards | July 19, 1898 |
| 1,689,099 | Applegate | Oct. 23, 1928 |
| 1,805,029 | Baker | May 12, 1931 |
| 1,837,605 | Baker | Dec. 22, 1931 |
| 1,891,425 | Kronquest | Dec. 20, 1932 |
| 2,090,129 | Kimball et al. | Aug. 17, 1937 |
| 2,100,441 | Greene | Nov. 30, 1937 |
| 2,154,696 | Phelps | Apr. 18, 1939 |
| 2,162,336 | Johnstone | June 13, 1939 |
| 2,251,197 | Nestmann | July 29, 1941 |
| 2,277,382 | Botz | Mar. 24, 1942 |
| 2,283,923 | Hall | May 26, 1942 |
| 2,299,504 | Sergent | Oct. 20, 1942 |
| 2,315,670 | Tascher et al. | Apr. 6, 1943 |
| 2,435,462 | Patterson | Feb. 3, 1948 |
| 2,437,414 | Archibald | Mar. 9, 1948 |
| 2,475,077 | Clancy | July 5, 1949 |
| 2,478,465 | Dodson | Aug. 9, 1949 |
| 2,484,572 | Jude | Oct. 11, 1949 |
| 2,487,033 | Thurman et al. | Nov. 1, 1949 |
| 2,531,087 | Tharaldsen | Nov. 21, 1950 |

FOREIGN PATENTS

| Number | Country | Date |
|---|---|---|
| 356,874 | Great Britain | Sept. 17, 1931 |